US009574828B2

(12) United States Patent
Van Dijck et al.

(10) Patent No.: US 9,574,828 B2
(45) Date of Patent: Feb. 21, 2017

(54) HEAT EXCHANGER

(75) Inventors: Wouter Denis Ann Van Dijck, Meise (BE); Patrick Piet A Dresen, Lier (BE); Tom André J Potters, Westerlo (BE)

(73) Assignee: ATLAS COPCO AIRPOWER NAAMLOZE VENNOOTSCHAP, Wilrijk (BE)

( * ) Notice: Subject to any disclaimer, the term of this patent is extended or adjusted under 35 U.S.C. 154(b) by 1040 days.

(21) Appl. No.: 13/262,726

(22) PCT Filed: Mar. 26, 2010

(86) PCT No.: PCT/BE2010/000024
§ 371 (c)(1),
(2), (4) Date: Oct. 3, 2011

(87) PCT Pub. No.: WO2010/115246
PCT Pub. Date: Oct. 14, 2010

(65) Prior Publication Data
US 2012/0031597 A1    Feb. 9, 2012

(30) Foreign Application Priority Data

Apr. 6, 2009    (BE) .................................. 2009/0213

(51) Int. Cl.
*F28D 9/00*    (2006.01)
*B01D 53/26*    (2006.01)
(Continued)

(52) U.S. Cl.
CPC ........... *F28D 9/0068* (2013.01); *B01D 53/265* (2013.01); *F28D 9/0093* (2013.01); *F28F 9/0273* (2013.01);
(Continued)

(58) Field of Classification Search
CPC .... F28F 2250/04; F28F 9/0273; F28F 9/0202; F28F 9/026; F28F 9/027; F28F 9/028; F28D 9/0093; F28D 9/0008; F28D 9/0075; F28D 9/0025
(Continued)

(56) References Cited

U.S. PATENT DOCUMENTS 1,828,477 A * 10/1931 Seligman .............. F28D 9/0075
165/164
2,595,440 A * 5/1952 Austin ...................... F28F 3/02
165/157
(Continued)

FOREIGN PATENT DOCUMENTS

CN    1073259 A    6/1993
CN    1094156 A    10/1994
(Continued)

OTHER PUBLICATIONS

International Search Report in PCT/BE2010/000024, Jan. 17, 2011.
(Continued)

*Primary Examiner* — Len Tran
*Assistant Examiner* — Gustavo Hincapie Serna
(74) *Attorney, Agent, or Firm* — Bacon & Thomas, PLLC

(57) ABSTRACT

Heat exchanger for exchanging heat between at least two fluids which are guided through chambers of the heat exchanger (1), wherein at least one guiding profile (11) is provided in the chambers (19,20), and the guiding profile (11) is an extruded tubular profile (12) which includes two parallel walls (13) which are connected to one another by means of two sidewalls (14). One or several dividing walls (15) extend in the extrusion direction of the tubular profile (12). One or several passages (17) are provided in the dividing walls (15) and/or in the sidewalls (14) for guiding a fluid.

18 Claims, 7 Drawing Sheets

(51) Int. Cl.
*F28F 9/02* (2006.01)
*F28D 21/00* (2006.01)

(52) U.S. Cl.
CPC .... *F28D 2021/0038* (2013.01); *F28F 2250/04* (2013.01)

(58) Field of Classification Search
USPC ................................. 165/140, 174, 166, 167
See application file for complete search history.

(56) References Cited

U.S. PATENT DOCUMENTS

| | | | | |
|---|---|---|---|---|
| 3,537,513 A | * | 11/1970 | Bridgnell | F28D 9/0043 165/104.19 |
| 3,792,842 A | * | 2/1974 | Nakako et al. | 261/148 |
| 6,044,902 A | * | 4/2000 | Pahade | F25J 3/0409 165/140 |
| 6,467,535 B1 | * | 10/2002 | Shembekar | F28D 7/0025 165/140 |
| 6,594,897 B2 | * | 7/2003 | Kim | B23P 15/26 165/177 |
| 7,197,887 B2 | * | 4/2007 | Maisotsenko | F24F 3/1411 165/165 |
| 7,303,002 B2 | * | 12/2007 | Usui | F28D 7/1684 165/109.1 |
| 2001/0054499 A1 | * | 12/2001 | Gerard | F25J 5/002 165/166 |
| 2002/0017372 A1 | * | 2/2002 | Yano | B21C 23/10 164/113 |
| 2007/0137843 A1 | * | 6/2007 | Gievers | 165/166 |
| 2007/0295027 A1 | * | 12/2007 | Howard | F25J 3/04218 62/640 |
| 2010/0175858 A1 | * | 7/2010 | Miao | F28D 9/005 165/166 |
| 2012/0255288 A1 | * | 10/2012 | Berger | F28D 9/0068 60/320 |

FOREIGN PATENT DOCUMENTS

| | | | |
|---|---|---|---|
| CN | 1195102 A | 10/1998 | |
| DE | 19519511 | 12/1995 | |
| DE | 20315267 | 4/2004 | |
| DE | 202005015627 | 2/2007 | |
| EP | 0798533 | 10/1997 | |
| EP | 1304536 | 10/2002 | |
| EP | 1600208 | 11/2005 | |
| JP | 10253286 | 9/1998 | |
| JP | 10253286 A | * 9/1998 | ............... F28F 9/02 |
| WO | 0181849 | 11/2001 | |

OTHER PUBLICATIONS

Written Opinion of ISA in PCT/BE2010/000024, Jan. 17, 2011.
Chinese Office Action dated Jan. 22, 2013, for CN 201080020852.7, and English translation thereof.

* cited by examiner

HEAT EXCHANGER

BACKGROUND OF THE INVENTION

1. Field of the Invention

The present invention concerns an improved heat exchanger.

2. Related Art

In particular, the invention concerns a heat exchanger for exchanging heat between at least two fluids being guided through the heat exchanger, whereby the heat exchanger is of the type which is built of parallel plates which are connected by means of connecting walls to define chambers provided with an inlet and an outlet. An inlet or outlet is situated in the connecting walls.

Both fluids are sent through adjacent chambers which are separated from one another by means of an above-mentioned plate, such that the heat can be transferred from one fluid to another fluid via the above-mentioned plate, which is thereby made of a heat-conducting material such as copper or aluminium.

In order to promote the heat transfer, strips with cooling fins are provided in the chambers between the parallel plates, which are also made of a heat-conducting material and which must enhance the contact surface between a fluid flowing through and the heat-conducting material of the heat exchanger in the known manner.

Said cooling fins guide the flow over a certain length of the chambers in a particular, preferred direction, whereby the shape of the cooling fins forces the flow to make a zigzag movement along the above-mentioned preferred direction.

Depending on the available space for the heat exchanger and the location of supply and discharge of the fluids, the above-mentioned inlets and outlets may be provided in different locations.

A first possibility is to guide the fluid in a straight line through a chamber, whereby the inlet and the outlet are situated in the extension of the preferred direction of the cooling fins.

Another possibility is to locally change the flow direction of the fluid one or several times as it flows through a chamber, for example when, due to lack of space or for other reasons, an inlet or an outlet must be positioned laterally in relation to a direction of flow through the strips with cooling fins, and as a result, the flow direction of the fluid must hereby take a hooked bend at the inlet or at the outlet.

In order to guide said change in the flow direction, guiding profiles are used which in some known embodiments of heat exchangers are formed of strips with cooling fins which connect at right angles, whereby the strips are mitred at an angle of preferably 45° and are joined so as to bend away the flow at right angles.

The lateral inlet and/or outlet must be sufficiently wide so as to obtain a good guiding, whereby for example in the case of a mitre joint of 45°, the inlet or outlet is equally wide as the width of the heat exchanger measured in a direction transversal to the longitudinal direction of the actual cooling fins.

This implies that the length of such a heat exchanger will increase along with the width, resulting in a sizeable heat exchanger.

In other known embodiments, use is made of a specially provided guiding profile in the shape of a pleated, thin metal plate which is each time folded down at right angles along successive parallel folding lines so as to form a profile with a series of successive parallel ridges and grooves as if it were, defined by parallel standing walls formed of folded plate which are alternately connected at the top or at the bottom by folded strips of the metal plate and whereby, in the standing walls, passages are provided at regular distances from one another.

Said guiding profile extends over the entire width of the heat exchanger between two opposite walls of the heat exchanger and thereby connects with one far end to an inlet or outlet in an above-mentioned wall, whereas the guiding profile also connects at right angles to the strips with cooling fins with one side wall, such that the fluid flowing in the guiding profile in the longitudinal direction is diverted at right angles in the direction of the preferred direction of the cooling fins.

A disadvantage of such profiles, however, is that they are difficult to produce and are not firm either, as a result of which they are easily deformed while being transported or processed.

As a result, such guiding profiles have to be put back into shape before use by means of an additional rolling or pressing operation or any other operation to flatten the guiding profiles.

Such an additional operation is disadvantageous in that it makes the production costs rise and in that the guiding profile is weakened due to fine cracks which may possibly occur, which has a negative effect on the general strength of the heat exchanger.

Moreover, it appears that following the above-mentioned rolling or pressing operation, the height of the guiding profile still is not entirely equal everywhere, such that in certain places, the guiding profile makes a good contact with the parallel plates defining the chamber in which the guiding profile has been provided, whereas in other places there is no contact or only a partial one, which results in a weak point in these places given the freedom of movement of the plates there.

SUMMARY OF THE DISCLOSURE

The present invention aims to remedy one or several of the above-mentioned and other disadvantages.

To this end, the invention concerns a heat exchanger of the above-mentioned type, whereby at least one guiding profile has been provided in these chambers to guide the flow through the chambers according to a selected course which changes direction at least locally between the inlet and the outlet, characterised in that the guiding profile is an extruded tubular profile comprising two parallel walls with which the tubular profiles make contact with the above-mentioned plates and which are connected to one another by means of two sidewalls and one or several dividing walls which internally divide the extruded tubular profile in two or several compartments extending in the extrusion direction of the tubular profile, and in that one or several passages for guiding a fluid are provided in the dividing walls and/or in the sidewalls.

The use of such an extruded tubular profile is advantageous in that it is easy to manufacture, with small tolerances moreover, which are typically smaller than one tenth of a millimeter for extruded profiles, which is largely sufficient to obtain a good supporting contact between the concerned wall of the guiding profile itself and an adjacent plate which provides for a separation between two successive levels of the heat exchanger.

Another advantage is that an extruded profile has a large bending stiffness, which adds to the general strength of the heat exchanger.

Another advantage of a heat exchanger according to the invention is that such a heat exchanger can also be applied under high pressure conditions, and that such a heat exchanger is far less liable to being damaged in case of occasional and/or accidental peak pressures.

Moreover, an additional rolling or pressing operation is no longer required to adjust the height right before the assembly of the heat exchanger.

Although an additional movement is required in the case of the invention to apply the passages in the dividing walls and sidewalls, this can also be done beforehand.

Yet another advantage is that the tubular profile, depending on the place where the passages are provided in the dividing walls and/or in the sidewalls, can be used for different purposes, such as to make the flow deflect at right angles according to a crosswise direction, making the flow turn in the opposite direction once or several times or making the flow diverge or converge if the tubular profile were to be used as an inlet or an outlet collector.

This makes the use of such a tubular profile very appropriate in applications whereby the heat exchanger is used to exchange heat between two fluids in a gaseous condition, such as between air and air, as well as in applications for exchanging heat between a gaseous medium and a cooling agent in the form of a gas or a liquid.

For both applications, a separate heat exchanger can be applied, adapted to that end to the application in question, either an application as a gas/gas heat exchanger, or an application as a gas/cooling agent heat exchanger.

A combination of both types of heat exchangers in a single combined heat exchanger is possible as well, however.

A practical application thereof is found in the drying of compressed air coming from a compressor, whereby a double heat exchanger is used with a first part for exchanging heat between two gaseous fluids, for example air and air, and a second part for exchanging heat between one of the above-mentioned gaseous fluids and a cooling agent in a gaseous form or in a liquid form.

In this application, the compressed air is successively guided between the two parts of the heat exchanger, whereby, in the second part, heat is exchanged with a cooling agent coming from an external cooling device as is known for example from Belgian patent number 1.016.649.

What makes said application interesting is that one and the same extruded tubular profile can be applied in both parts of the heat exchanger, resulting in lower production costs than in the case of the known heat exchangers whereby different types of guiding profiles are used.

Thanks to an appropriate selection of the plates and dimensions, a favourable distribution of the mediums can be obtained as they flow through the chambers of the heat exchanger, whereby a favourable, uniform distribution of the flow rate can be provided for over the entire width of the heat exchanger, for example.

BRIEF DESCRIPTION OF THE DRAWINGS

In order to better explain the characteristics of the invention, the following preferred embodiments of an improved heat exchanger according to the invention are described by way of example only without being limitative in any way, with reference to the accompanying drawings, in which.

DETAILED DESCRIPTION OF PREFERRED EMBODIMENTS OF THE INVENTION

Figure 1:
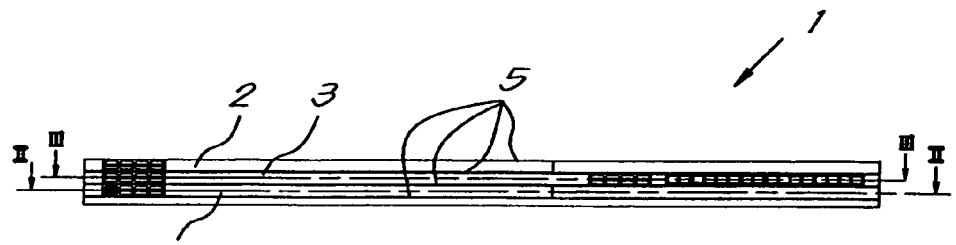
FIG. 1 schematically represents a section of a heat exchanger according to the invention.

The heat exchanger 1 represented in FIG. 1 in this case consists of three levels 2, 3 and 4 which are defined by and separated from one another by means of parallel plates 5.

In the top and bottom level, 2 and 4 respectively, chambers 6 are defined by the above-mentioned plates 5 which are connected at their side edges by connecting walls 7 in the longitudinal direction and a connecting wall 8 in the width.

Figure 2:
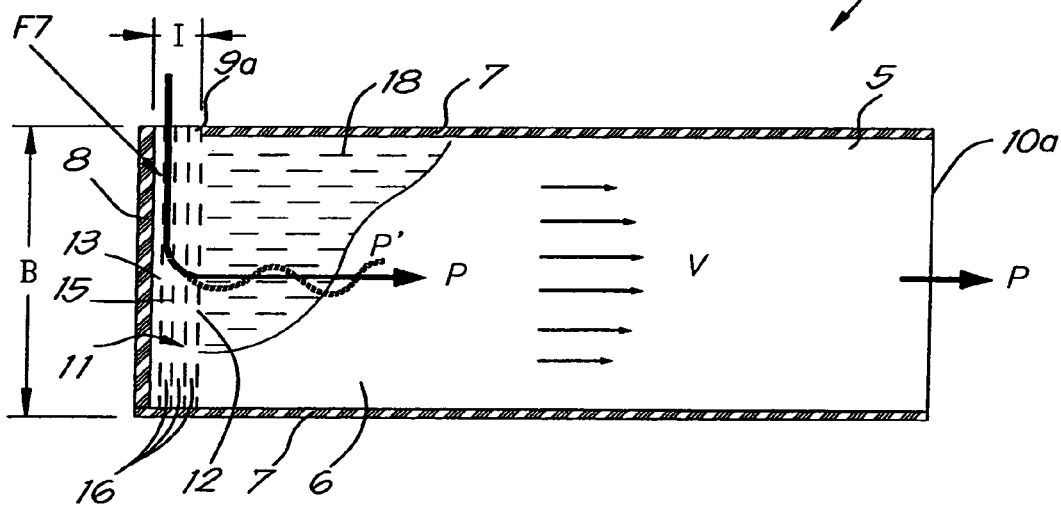
FIGS. 2 and 3 represent sections according to lines II-II and in FIG. 1 respectively, whereby certain elements have been omitted.

These chambers 6 are, as shown in the section of FIG. 2, provided with a lateral inlet 9a in the connecting wall 7 on one side and with an outlet 10a extending over the width B of the heat exchanger 1 on the other side.

Figure 4:
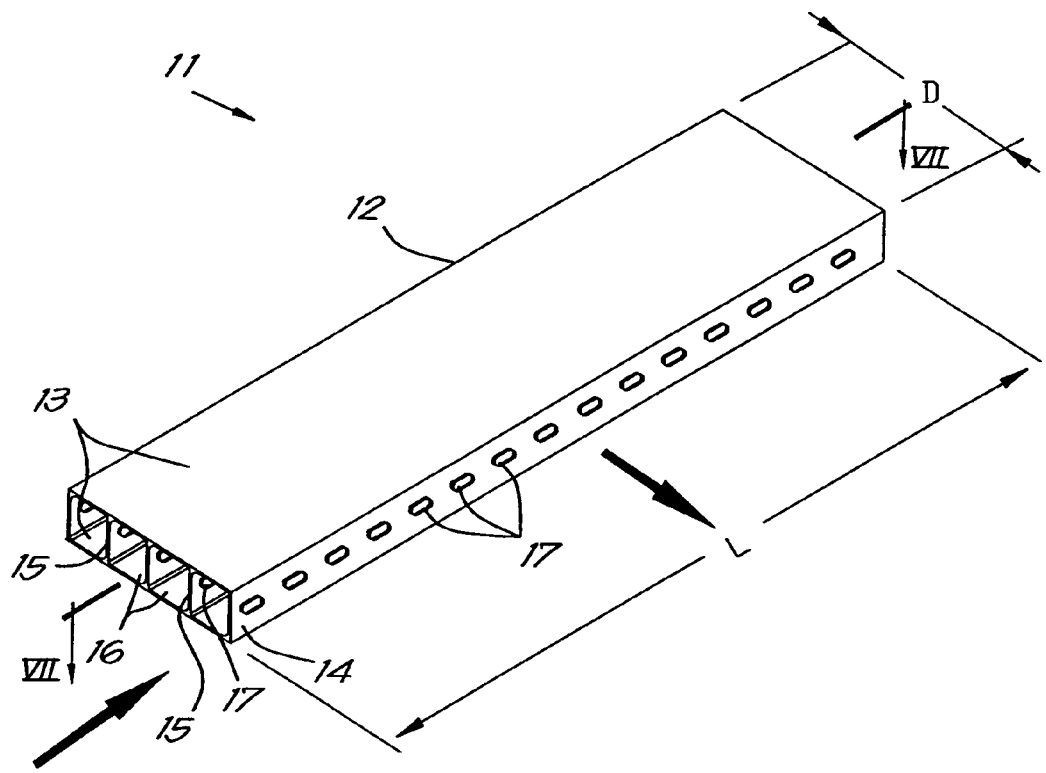
FIG. 4 is a perspective drawing of the part indicated by arrow F4 in FIG. 2.
Figure 5:
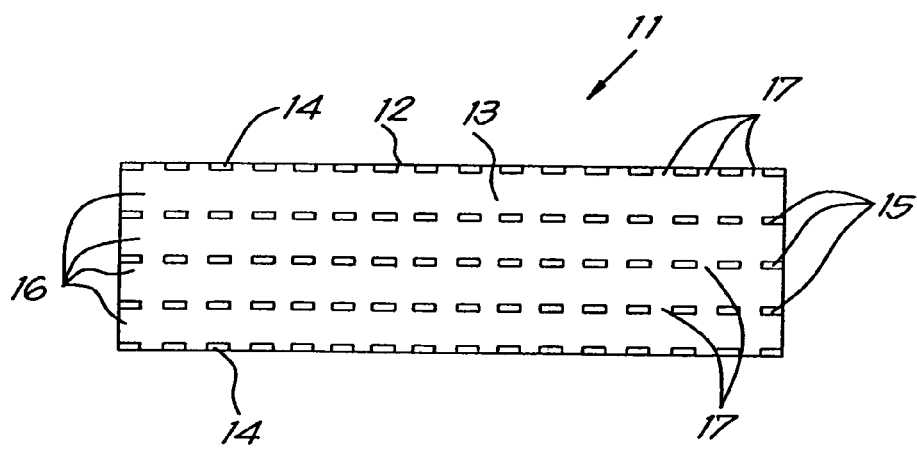
FIG. 5 shows a section according to line V-V in FIG. 4.

Opposite the inlet 9a is provided a guiding profile 11 in these chambers 6 which, seen in perspective and as a section in FIGS. 4 and 5, is held between the inlet 9a and the opposite connecting wall 7 of the chamber 6 with its far ends and thus extends over the entire width B of the chamber 6 and with its extrusion direction in the prolongation of the fluid flowing in or of the fluid flowing out.

Figure 6:
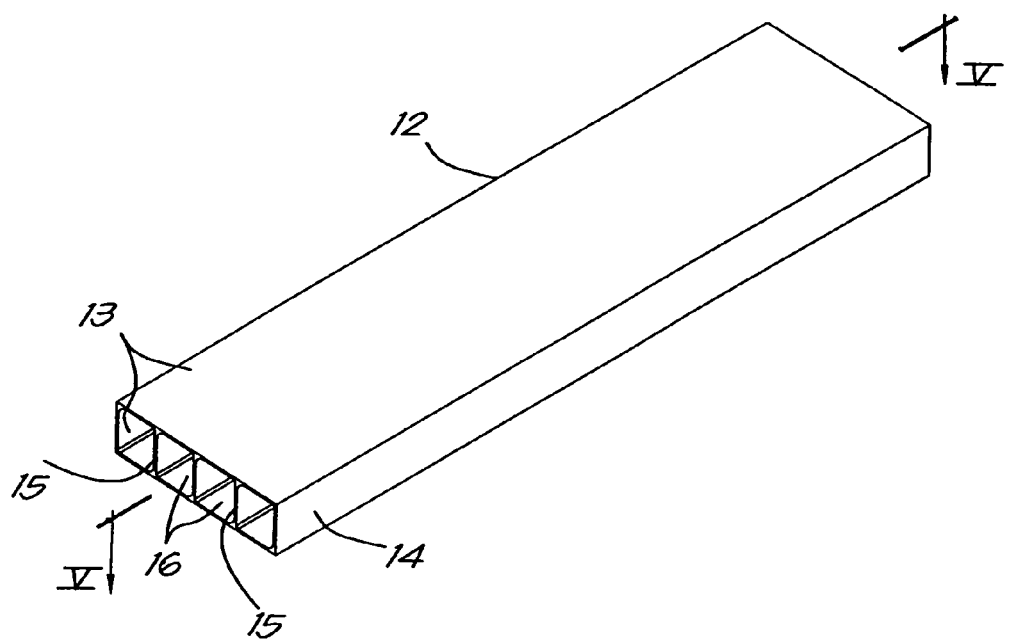
FIGS. 6 and 7 show analogous views as those in FIGS. 4 and 5, but for an extruded base profile which has served to manufacture the part which is represented in FIGS. 4 and 5.
Figure 7:
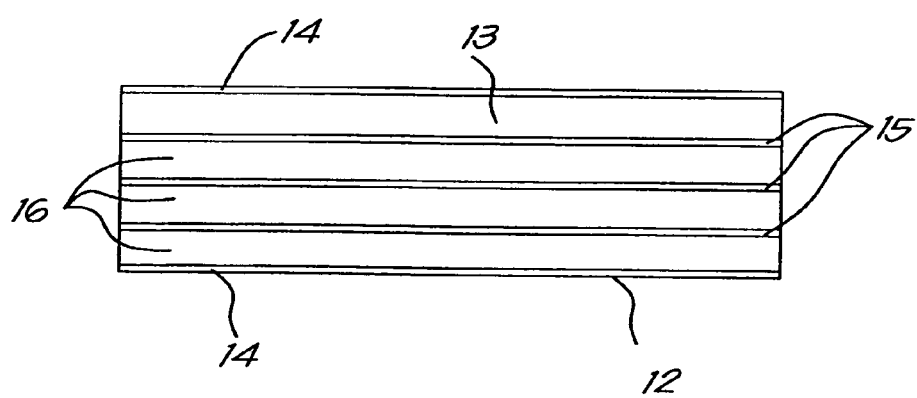

The above-mentioned guiding profile 11 is made on the basis of an extruded tubular profile 12 as represented in FIGS. 6 and 7, which tubular profile 12 is formed of two parallel flat or mainly flat walls 13 with which the guiding profile 11 makes contact with the parallel plates 5 defining levels 2, 3 and 4, which walls 13 are connected by means of two sidewalls 14 and by dividing walls, in this case three dividing walls 15 which divide the tubular profile 12 internally in several compartments 16 which extend in the extruding direction in the length of the tubular profile 12.

The guiding profile 11, as represented in FIGS. 4 and 5, is formed by additionally providing the tubular profile 12 with passages 17 in both sidewalls 14 and in the dividing walls 15, whereby these passages 17 are equally distributed over the entire length L of the tubular profile 12 concerned.

Said passages 17 can for example be formed by means of drilling or milling.

The tubular profile 12 extends with its width D over the entire width I of the inlet 9a and serves as a guiding profile 11 to bend a fluid which is introduced in the chamber 6 via the above-mentioned lateral inlet 9a at right angles, and thus guide the flow through the passages 17 in the longitudinal direction of the heat exchanger 1 to the outlet 10a, as represented by means of the arrows P.

In the flow behind the guiding profile 11 are provided strips with cooling fins 18 which guide the flow according to a preferred direction, whereby the cooling fins connect at right angles to a sidewall 14 of the above-mentioned tubular profile 12 and extend over the entire width B up to near the above-mentioned outlet 10*a*, whereby only a part of these cooling fins 18 is represented in FIG. 2.

The cooling fins usually have a shape which directs the flow in the above-mentioned preferred direction according to a zigzag movement as is schematically represented in FIG. 2 by means of a dotted line P'.

The fluid which is guided through the chambers 6 will hereby absorb heat from or dispense heat to the intermediate level 3, in which two chambers 19 and 20 are defined which are separated from one another by means of a cross partition 21 and by connecting walls 7 and 8 along the edges of the plates 5.

The first chamber 19 at said level 3 is thereby provided with a lateral inlet 9*b* on one far end and with a diametrically opposed outlet 10*b*, whereby opposite said inlet 9*b* and said outlet 10*b* is provided a guiding profile 11 as is represented in FIG. 4 which extends over the width B of the heat exchanger 1.

The space of the chamber 19 between both tubular profiles 12 is filled with strips with cooling fins 18.

Figure 8:
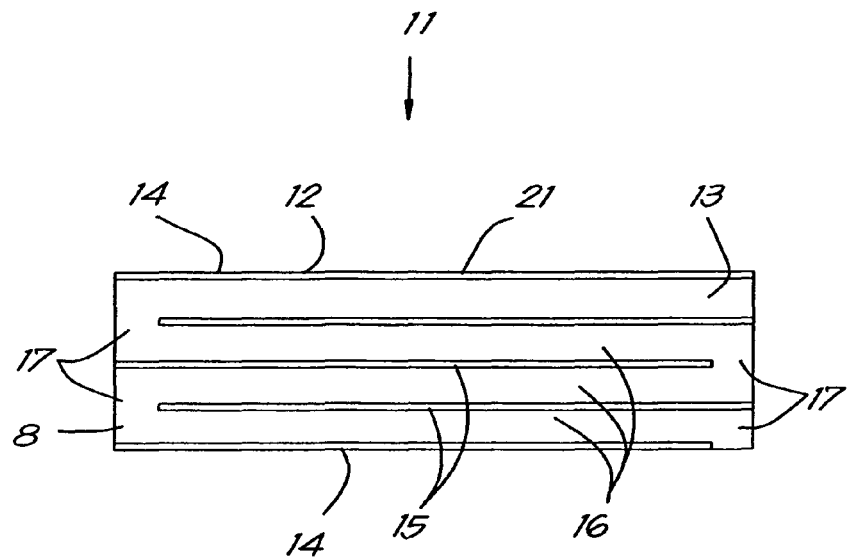
FIG. 8 shows an analogous section as in FIG. 5, but for the part indicated by F8 in FIG. 3.

The second chamber 20 on the other hand, is provided with an inlet 9*c* and an outlet 10*c* in two corners along one and the same connecting wall 7 and is filled with a series of laterally adjacent guiding profiles 11, in this case four adjacent guiding profiles 11 as shown in FIG. 8.

Said guiding profiles 11 are held with their far ends between two opposite connecting walls 7 of the chamber 20, and they extend lengthwise over the entire width B of the heat exchanger 1.

The connecting walls 7 hereby serve as stop walls which seal the guiding profiles 11 at the far ends, save at the inlet 9*c* and at the outlet 10*c* which each leave one compartment 16 open at a far end.

It is not excluded for the inlet 9*c* and the outlet 10*c* to be provided in two opposite walls 7 instead of in one and the same wall 7.

The guiding profiles 11 in the chamber 20 are made of one and the same type of extruded tubular base profile 12 as shown in FIG. 6, but whereby, in this case, the dividing walls 15 are left full, save at the far ends where the dividing walls 15 have been partially milled off so as to form passages 17 between the compartments 16.

In their adjacent sidewalls 14, the guiding profiles 11 are also provided with a passage 17 on one side, such that the fluid can flow through from one profile to the following adjacent profile 11.

Figure 3:
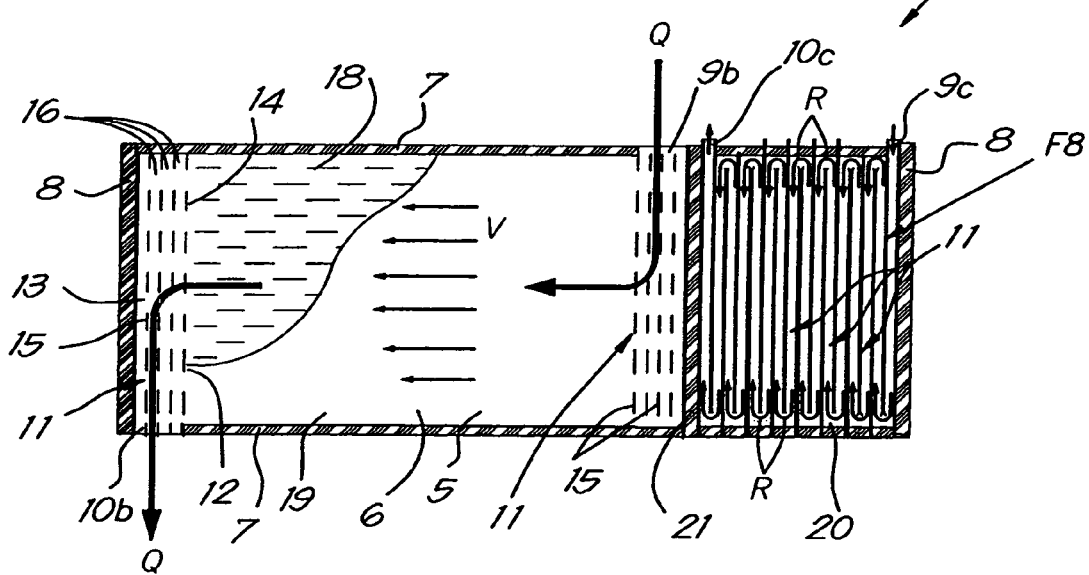

Said passages 17 at the far ends in the dividing walls 15 are alternately provided according to a cross pattern, each time at one far end, such that a fluid which is introduced at one far end of one compartment 16 will have to follow a labyrinth-shaped path through the successive compartments 16, whereby the direction of flow at the passages 17 at the far ends of the dividing walls 15 is reversed, as shown by means of the arrows R in FIG. 3.

The heat exchanger 1 is built of heat-conducting materials such as aluminium or copper, and it is held together in that the parallel plates 5 are provided with a melting layer, whereby, after the assembly, the heat exchanger 1 is put in a hot bath or in a hot oven so as to make the melting layer melt, and it is subsequently made to solidify again in a cooler environment.

The heat exchanger 1 is further welded along the edges and it is provided with collectors for the supply and discharge of the fluids, which collectors are not represented in the figures for clarity's sake.

The working of the heat exchanger 1 is very simple and as follows.

A first fluid is guided in the direction of the arrows P through the chambers 6 in the top and bottom level, 2 and 4 respectively.

A second fluid is simultaneously guided through the first chamber 19 of the intermediate level 3, in the direction of the arrows Q in FIG. 3.

The flow Q in the first chamber 19 of the intermediate level 3 hereby largely runs in the sense opposite to the flow P in the adjacent levels 2 and 4.

If the temperature of the fluid at one level is different from the temperature at an adjacent level, there will be a heat transfer from one level to the other one. The heat is thereby transferred via the cooling fins 18 and the plates 5 between the levels 2, 3 and 4, whereby the cooling fins 18 are designed to enlarge the contact surface, and thus the heat transfer surface, with the fluid in order to promote a quick and efficient heat transfer.

The fluid flowing through the top and bottom level 2 and 4 thereby transgresses the zone of the intermediate level 3, where the second chamber 20 is situated at this level.

Said second chamber 20 is designed to guide a coolant, for example in the form of Freon coming from a cooling device, for example.

Said coolant thereby follows a zigzag movement in to and fro movements through the compartments 16 of the tubular profile 12 as represented by means of the arrows R in FIG. 3, whereby the flow direction is each time reversed at a passage 17 at the far end of the tubular profile 12.

Consequently, there is an additional heat transfer in this zone between the fluid in the top and bottom level 2 and 4 on the one hand, and the cooling agent in the second chamber 20 of the intermediate level 3 on the other hand.

As the guiding profiles 11 are extruded profiles, they can be produced by means of a simple extrusion with very high flatness tolerances of less than one tenth of a millimeter, as a result of which the plates 5 make contact with the latter over the entire or practically the entire surface of the flat walls 13 of the tubular profiles 12, which is favourable to the bursting pressure of a heat exchanger 1 according to the invention.

Although the guiding profiles 11 in the figures are represented with flat walls 13, it is not excluded for these walls to be provided with local recesses, for example in the shape of grooves or the like.

Figure 9:
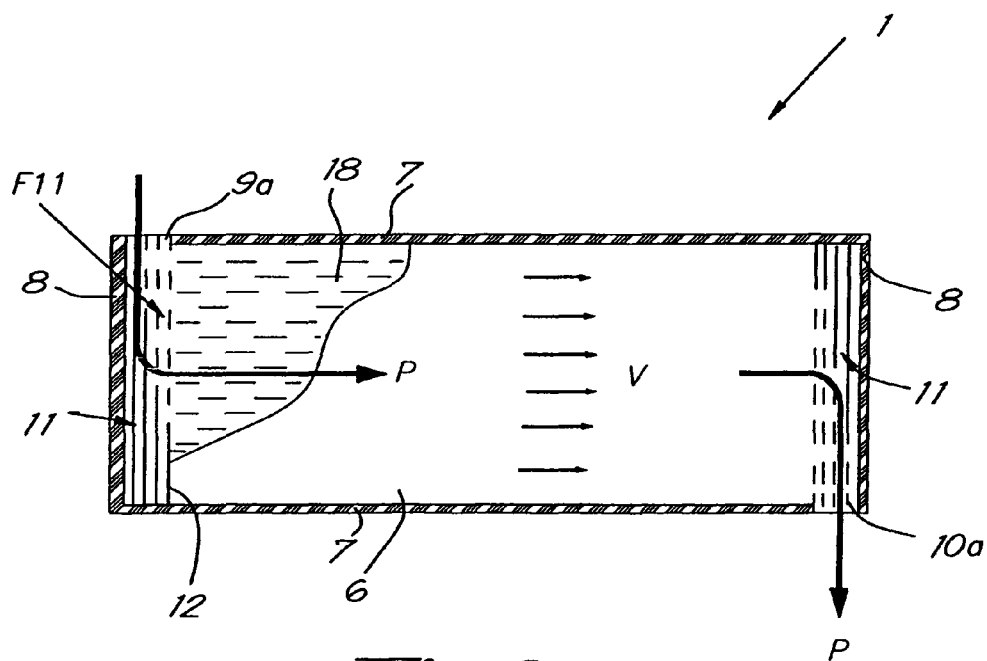
FIGS. 9 and 10 represent sections as those in FIGS. 2 and 3 respectively, but for another embodiment of the heat exchanger.
Figure 10:
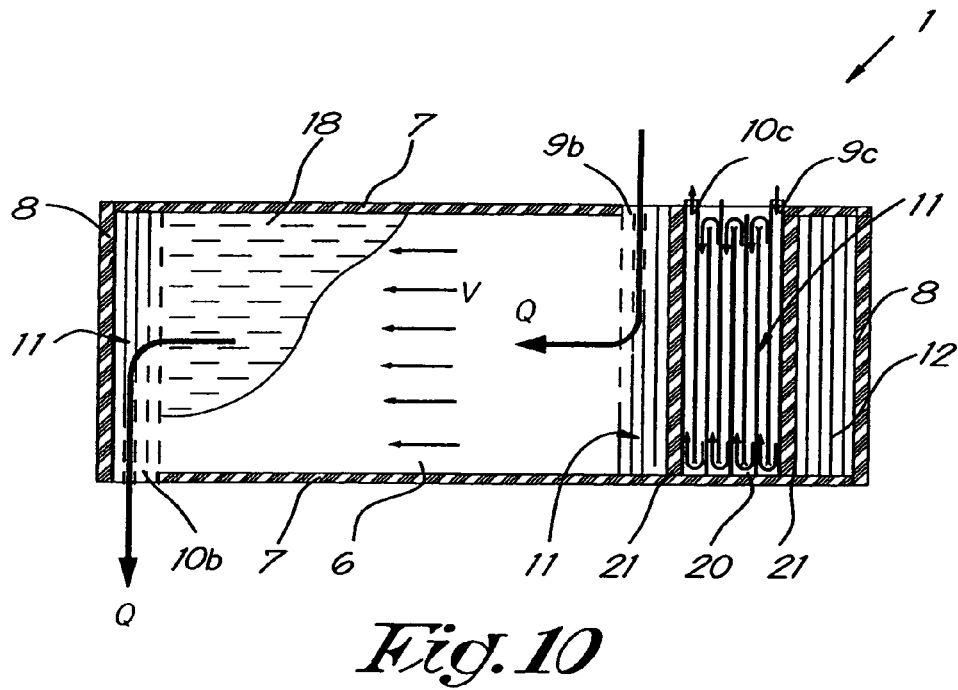

FIGS. 9 and 10 show sections of an alternative heat exchanger 1 according to the invention which represents some differences compared to the above-described embodiment of FIGS. 1 to 3.

A first difference consists in that at the top and bottom level, 2 and 4 respectively, there is a bend at right angles at the inlet 9*a* as well as at the outlet 10*a*.

Figure 11:
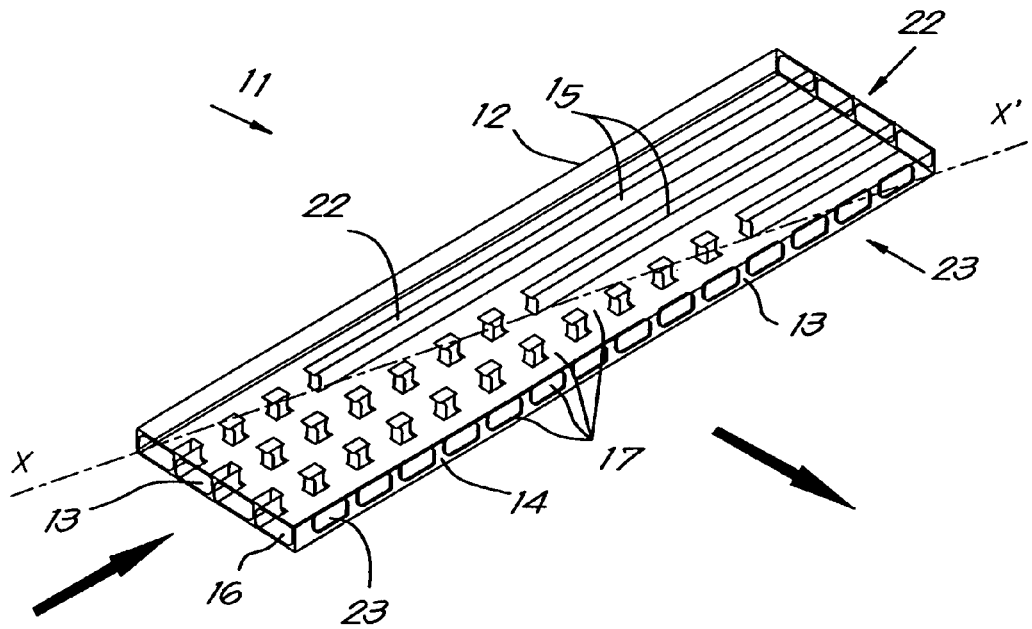
FIG. 11 shows the part indicated by arrow F11 in FIG. 9 in perspective and with partial omissions.

In this case, this is realised by means of a guiding profile 11 which is represented in FIG. 11 and which is built round the same type of extruded tubular profile 12 as represented in FIG. 6 as is used for the guiding profiles 11 described above, but whereby the passages 17 in the dividing walls 15 and in the sidewalls 14 are selected such that the flow rate, which is guided through the zone with cooling fins 18, is distributed as uniformly as possible over the width B of the heat exchanger 1.

Said distribution is schematically represented in FIGS. 9 and 10 by the arrows V, whose length is a measure for the speed of the flow.

As becomes clear from a comparison of the above-mentioned arrows V in said FIGS. 9 and 10 with the corresponding arrows V in FIGS. 2 and 3, an even more uniform distribution of the flow is obtained in the case of the embodiment in FIGS. 9 and 10 than in the case of the embodiment in FIGS. 2 and 3.

This is obtained as the passages 17 in the dividing walls 15 and in the sidewalls 14 of the tubular profile 12 are not provided over the entire length, but over only a limited length of the tubular profile 12, and whereby the length over which the passages 17 are provided increases as of the sidewall 14 of the tubular profile 12 which is adjacent to a connecting wall 8 of the chamber 19 towards the sidewall 14 which is directed towards the chamber 19.

In other words, the passages 17 are distributed in such a way that the tubular profile 12 is divided in two zones 22 and 23 which are mainly separated according to a geometrical diagonal line X-X' which connects two diagonally opposed corners of the tubular profile 12 and which differ from one another in that the zone 22 is not provided with such passages 17, whereas the zone 23 is.

A second difference consists in that, next to the second chamber 20 on the intermediate level 3, an additional tubular profile 12 is provided in which are not necessarily provided passages 17, and which has no other function than to support the overlying and underlying guiding profile 11 which forms the outlet 10a of the chambers 6 in the top and bottom level 2 and 4.

The working of such a heat exchanger 1 is analogous to that of the already described embodiment.

It is clear that in the preceding embodiments of heat exchangers according to the invention, the described heat exchangers 1 are double heat exchangers 1 with a first part in which heat is transferred between two fluids, such as air/air, and a second part in which heat is transferred to one of said fluids and a cooling agent, such as Freon.

However, both parts can also be made as separate heat exchangers which can each be applied separately or combined.

Figure 12:
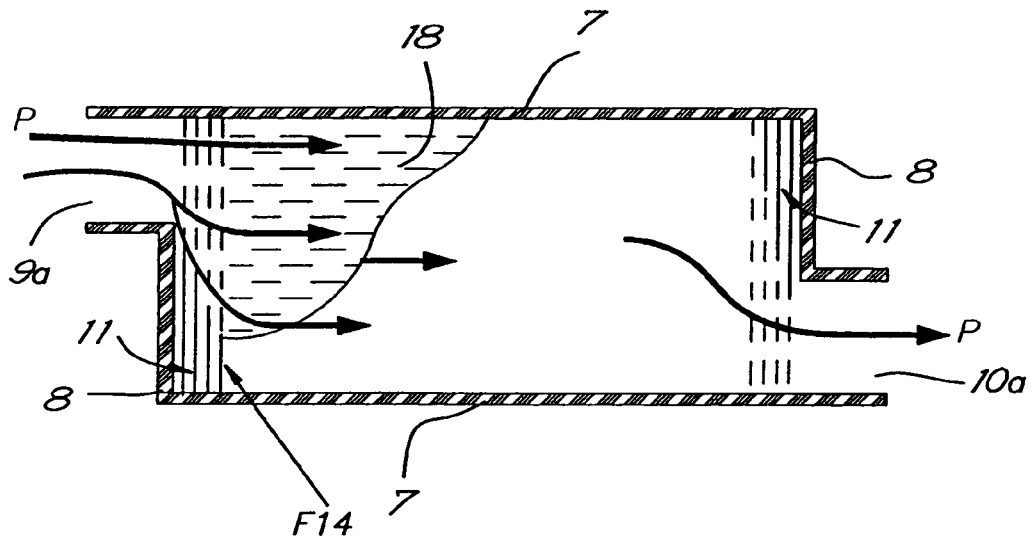
FIGS. 12 and 13 show views analogous to those in FIGS. 2 and 3, but for yet another embodiment of a heat exchanger according to the invention.
Figure 13:
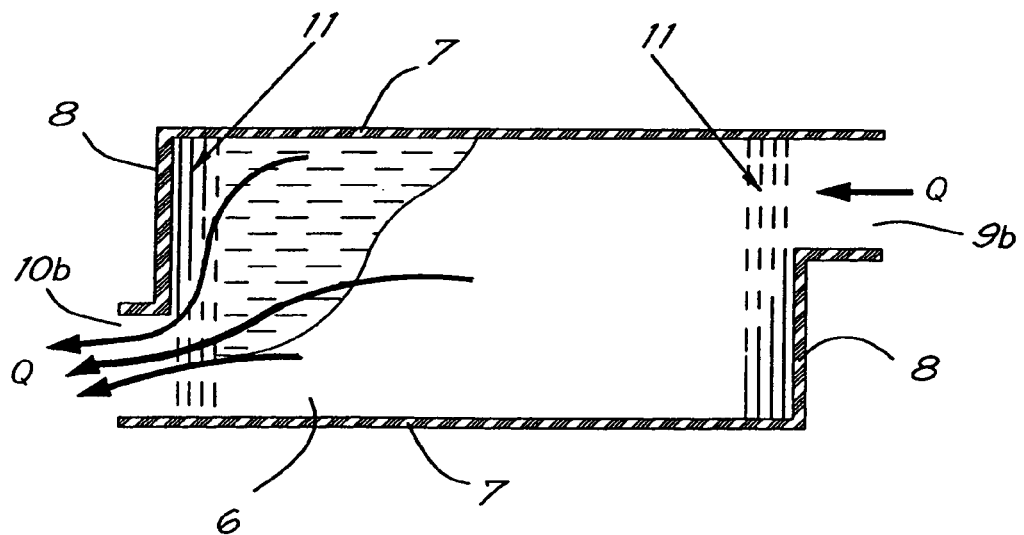

An example thereof is represented in FIGS. 12 and 13 which show a variant of a single heat exchanger 1 according to the invention for the exchange of heat between two gases.

The inlets and outlets 9a and 10a at the levels 2 and 4, and the inlets and outlets 9b and 10b at the intermediate level 3 are in this case provided at the far ends of the heat exchanger 1, in particular in the walls 8 instead of at the connecting walls 7 of the heat exchanger 1.

Figure 14:
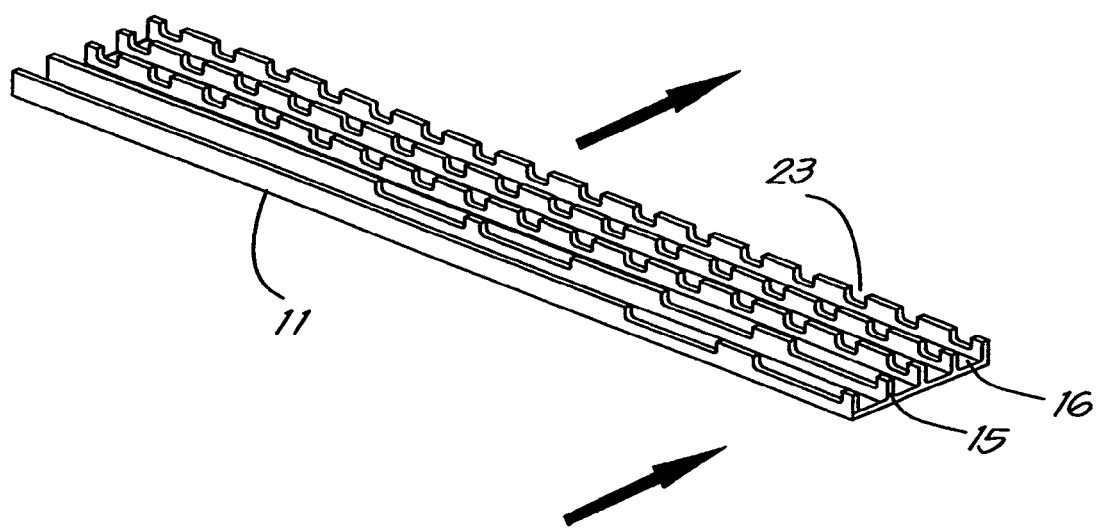
FIG. 14 is a cut view in perspective of the part indicated by F14 in FIG. 12.

In this case, use is made of a guiding profile 11, as represented in FIG. 14, which is also based on the same type of extruded, tubular base profile 12 according to FIG. 6, in which passages 17 are provided which make it possible to use the guiding profile 11 as an inlet or an outlet collector.

The guiding profile 11 is hereby flowed through in the cross direction from one sidewall 14 to the other sidewall 14, whereby the guiding profile 11 is adjacent to a connecting wall with one sidewall 14, which is provided with an inlet 9 or with an outlet 10, and whereby the total flow-through surface of the passages 17 in the sidewalls 14 and in the dividing walls 15 increases as of the sidewall 14 opposite the inlet or outlet 9 or 10 towards the other sidewall 14.

Thus, the incoming flow is divided for example over the entire width B of the heat exchanger 1, starting from an inlet 9 with smaller dimensions, for example an inlet 9 which extends over about half the width of the heat exchanger 1. In the same way, at the outlet 10, the flow can be channelled over the entire width B of the heat exchanger 1 to an outlet 10 with smaller dimensions.

Thus, the outlet 10b at the intermediate level 3 can be provided for example at half a width B of the heat exchanger 1, whereas the inlet 9a of the overlying and underlying level 2 and 4 can be provided on the other half width of the heat exchanger 1.

All the preceding examples of heat exchangers 1 should make it clear that different types of heat exchangers 1 can be assembled, starting from one and the same type of extruded tubular profile 12 which, depending on what pattern the passages 17 have been provided, can provide for different functions to guide the fluid through the heat exchanger 1 and can be flexibly adjusted to the specific built-in situation whereby, for example, the plates for the supply and discharge of the fluids and the available built-in space are fixed.

Although the figures always represent a heat exchanger 1 with three levels, the invention can just as well be applied to heat exchangers 1 with more or less levels.

It is clear that the invention is also applicable to some heat exchangers 1 in which heat is exchanged between only two fluids, for example air/air or air/cooling agent.

Although the figures each time represent a single tubular profile 12, it is not excluded to apply several tubular profiles 12 in a contiguous manner, whereby in the adjacent sidewalls 14, corresponding passages 17 should preferably be provided, such that the fluids can be guided from one tubular profile 12 to the other tubular profile 12.

The present invention is by no means restricted to the embodiments described by way of example and represented in the accompanying drawings; on the contrary, such a heat exchanger 1 according to the invention can be made in all sorts of shapes and dimensions while still remaining within the scope of the invention.

The invention claimed is:

1. A heat exchanger for exchanging heat between at least two fluids being guided through the heat exchanger, the heat exchanger comprising:
   parallel plates connected to one another by connecting walls defining chambers which are provided with an inlet and an outlet, each in a connecting wall, which guide the fluid through the chambers, and
   wherein, in the chambers there is provided at least one guiding profile guiding the flow through the chambers according to a selected course which changes direction at least locally between the inlet and the outlet;
   wherein the at least one guiding profile comprises an extruded tubular profile having two parallel walls enabling the tubular profile to make contact with the parallel plates, said walls being connected to one another by two sidewalls and one or several dividing walls which internally divide the extruded tubular profile in two or several compartments extending in the extruding direction of the tubular profile, and wherein one or several fluid guiding passages are provided in the dividing walls and/or in the sidewalls, and
   wherein the at least one guiding profile is configured in a way such that the two parallel walls of the tubular profile contact, along an entire width of the tubular profile, the parallel plates defining the respective chambers and the two parallel walls of the tubular profile contact the respective chambers along an entire width of the inlet and/or the outlet of the chambers.

2. The heat exchanger according to claim 1, wherein the guiding profile is an extruded tubular profile which deflects the direction of fluid flow crosswise.

3. The heat exchanger according to claim 2, wherein the extruded tubular profile includes a series of passages provided in the dividing walls and in at least one sidewall spaced from one another.

4. The heat exchanger according to claim 2, wherein the tubular profile is provided with one far end opposite an inlet or an outlet of a chamber and with an extrusion direction in a same direction as the fluid flowing in or the fluid flowing out, and with the sidewall provided with passages directed towards the chamber.

5. The heat exchanger according to claim 2, wherein the dividing walls and the sidewall with passages are provided with said passages over a restricted length only.

6. The heat exchanger according to claim 5, wherein the passages in the dividing walls and in the sidewall are distributed such that the tubular profile is divided into two zones which are mainly separated according to a geometrical diagonal line X-X' which connects two diagonally opposed corners of the profile, so that in one zone the dividing walls and the sidewall have no passages, and in the other zone the partitions and the sidewall are provided with passages spaced from one another.

7. The heat exchanger according to claim 1, wherein the guiding profile comprises an extruded tubular profile which defines an inlet collector or an outlet collector which guides the flow in a broadening manner at the inlet, or respectively in a narrowing manner at the outlet.

8. The heat exchanger according to claim 7, wherein the tubular profile has opposed far ends, and is held with its far ends between two opposite connecting walls of the chamber in which the tubular profile has been provided, and including passages provided in both sidewalls and in all the dividing walls, so that the tubular profile is adjacent with one sidewall to a connecting wall which is provided with an inlet or with an outlet, and the total flow-through surface of the passages, in a sidewall or in a dividing wall, increases in a direction from the sidewall opposite the inlet or outlet towards the other sidewall.

9. The heat exchanger according to claim 8, wherein the inlet or outlet is disposed at one far end of the tubular profile and the sidewall which is directed away from the inlet or outlet is provided with evenly distributed passages over its entire length.

10. The heat exchanger according to claim 1, configured to exchange heat between two gaseous media.

11. The heat exchanger according to claim 1, wherein the guiding profile comprises an extruded tubular profile which is configured to change the direction of fluid flow once or several times during its passage through the chamber.

12. The heat exchanger according to claim 11, wherein the tubular profile has opposed far ends, and is provided with a passage in a dividing wall and/or in a sidewall on at least one far end, and the far ends of the profile are sealed by a stop wall; wherein an inlet and an outlet for the fluid are provided in the shape of a passage in the sidewall or a passage in a stop wall at a far end of a compartment of the profile.

13. The heat exchanger according to claim 3, wherein the tubular profile has opposed far ends, and is held with its far ends between two opposite connecting walls of the chamber in which the tubular profile has been provided, and the connecting walls define stop walls, with or without an inlet or an outlet opposite a far end of a compartment of the tubular profile.

14. The heat exchanger according to claim 13, wherein the chamber is filled with parallel tubular profiles which are adjacent to one another with their sidewalls, and wherein the inlet of one profile connects to the outlet of an adjacent profile.

15. The heat exchanger according to claim 1, wherein the heat exchanger is configured to exchange heat between a gas and a cooling agent.

16. The heat exchanger according to claim 10, wherein the heat exchanger is a double heat exchanger having a first part exchanging heat between two gaseous fluids, and a second part exchanging heat between gaseous fluids and a cooling agent in a gaseous or liquid form.

17. The heat exchanger according to claim 16, wherein the heat exchanger is configured to dry compressed air which is successively guided through both parts of the heat exchanger and wherein, in the second part, heat is exchanged with a cooling agent supplied from an external cooling device.

18. The heat exchanger according to claim 1, wherein the at least one guiding profile is provided at each inlet of the chambers and configured in a way such that the at least one guiding profile bends a fluid which is introduced into a chamber via a lateral inlet to guide the flow to the outlet of the chambers.

* * * * *